United States Patent [19]
Schmid et al.

[11] Patent Number: 5,672,045
[45] Date of Patent: Sep. 30, 1997

[54] SYSTEM FOR STACKING SHEETS ON PALLETS

[75] Inventors: Frank Matthias Schmid, Krefeld; Ernst Claassen, Goch, both of Germany

[73] Assignee: Jagenberg Papiertechnik GmbH, Neuss, Germany

[21] Appl. No.: 555,983

[22] Filed: Nov. 10, 1995

[30] Foreign Application Priority Data

Nov. 11, 1994 [DE] Germany .................. 44 40 367.4

[51] Int. Cl.[6] .................................................. B65H 29/50
[52] U.S. Cl. .................. 414/794.5; 414/786; 414/790.8; 414/793.8; 414/794.3
[58] Field of Search .................. 198/592; 414/790.8, 414/793.8, 794.3, 794.5, 789.1, 786

[56] References Cited

U.S. PATENT DOCUMENTS

| | | | |
|---|---|---|---|
| 2,937,485 | 5/1960 | Wall | 414/789.1 |
| 3,178,053 | 4/1965 | Robinson | 414/927 |
| 3,690,435 | 9/1972 | King et al. | 198/592 |
| 4,712,975 | 12/1987 | Salts | 414/789.1 |
| 4,787,621 | 11/1988 | Sattler | 414/789.1 |
| 5,051,058 | 9/1991 | Roth | 414/789.1 |
| 5,160,129 | 11/1992 | Siriporn et al. | 414/789.1 |
| 5,304,030 | 4/1994 | Neri | |
| 5,421,698 | 6/1995 | Neri et al. | 414/789.1 |

FOREIGN PATENT DOCUMENTS

| | | | |
|---|---|---|---|
| 665034 | 6/1963 | Canada | 414/798.1 |
| 4101038 | 7/1992 | Germany | |

*Primary Examiner*—Karen B. Merritt
*Assistant Examiner*—Douglas A. Hess
*Attorney, Agent, or Firm*—Herbert Dubno; Andrew Wilford

[57] ABSTRACT

An apparatus for stacking sheets on pallets has a conveyor belt having horizontally extending upper and lower reaches extending through a stacking station with the upper reach defining a horizontal support plane and extending in an outfeed direction. Two sets of deflectors spaced apart in the outfeed direction engage the upper reach to form therein respective upwardly open U-shaped loops below the plane. A lift has a pair of support beams extending transverse to the direction and jointly displaceable between a lower position received in the respective loops and below the plane and an upper position above the plane. A succession of sheets is fed to the station to form on a pallet supported on the beams in the upper position thereof a stack of the sheets. The lift can be raised and lowered to displace it from the upper position to the lower position to deposit on the belt the pallet and stack of sheets on the beams. A drive advances the belt in the outfeed direction with the beams in the lower position to convey the stack of sheets hitherto supported on the beams away from the lift in the outfeed direction.

13 Claims, 2 Drawing Sheets

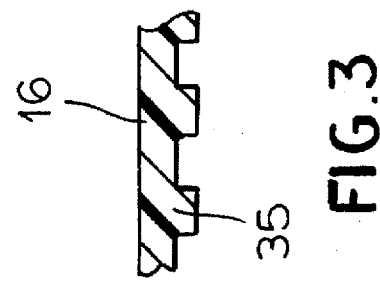
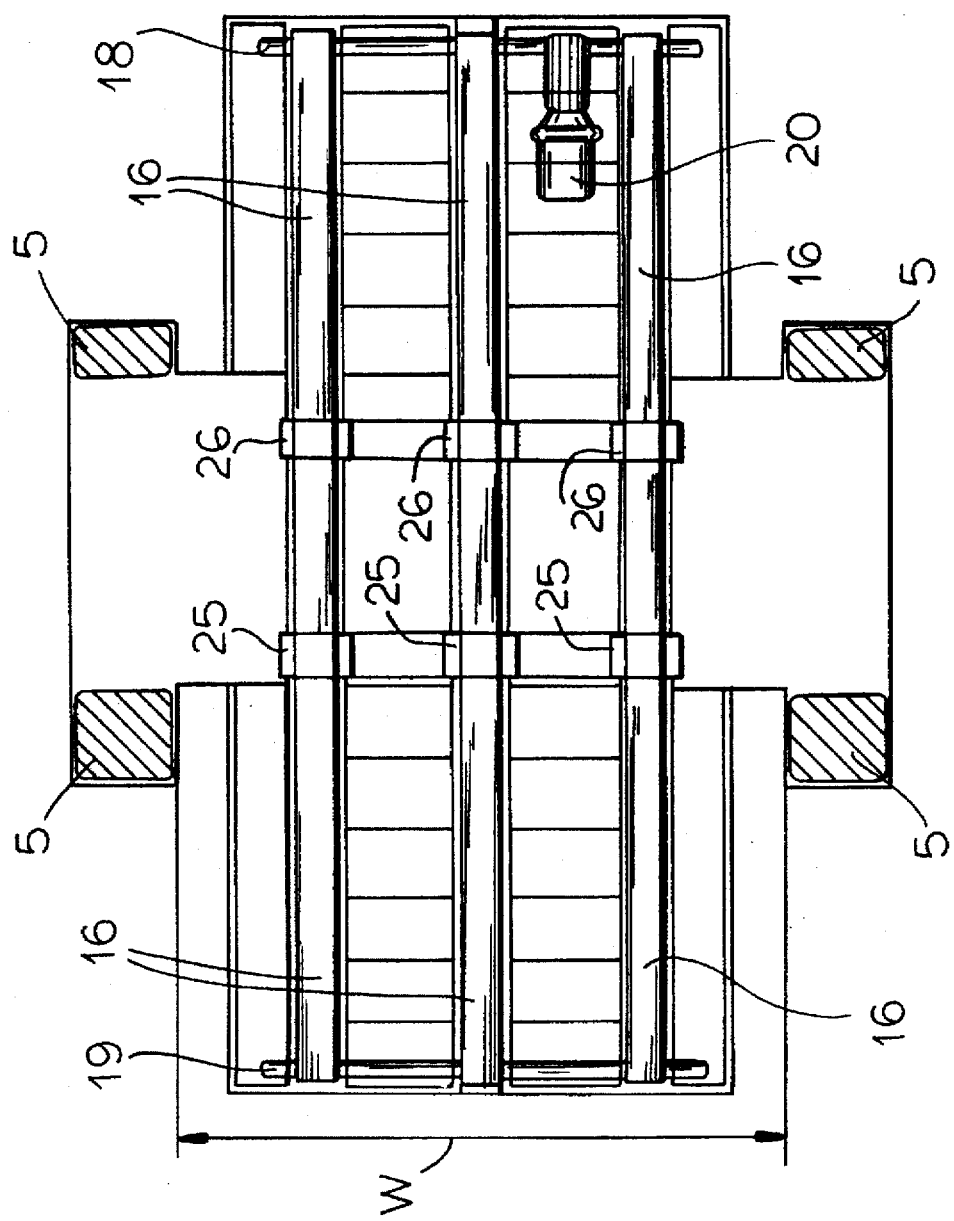

SYSTEM FOR STACKING SHEETS ON PALLETS

FIELD OF THE INVENTION

The present invention relates to the stacking of sheets on pallets, for instance in a paper mill. More particularly this invention concerns an apparatus for and method of stacking sheets on pallets.

BACKGROUND OF THE INVENTION

In a paper mill sheets are produced in rapid succession and are delivered in overlapping fashion to a stacker where they are piled up on pallets. Once each pile reaches the desired size, the pallet is moved out and a new pallet is positioned to receive the incoming sheets. Normally the pallet is carried on a lift so that it can be lowered as the stack forms.

German patent document 4,101,038 of Voss discloses a system where a floor-mounted conveyor comprised of an array of rollers supports the pallets as they move through the station where the stacks are formed. Such a conveyor system is fairly complex and is difficult to adapt to different transport distances.

In U.S. Pat. No. 5,304,030 of Neri a stack conveyor is shown having a transport belt. This system is not integrated with a stacker. It is located above-ground and could not readily replace the roller system described above.

OBJECT OF THE INVENTION

It is therefore an object of the present invention to provide an improved sheet-stacking system.

Another object is the provision of such an improved sheet-stacking system which overcomes the above-given disadvantages, that is which operates surely while being of relatively simple and trouble-free construction.

A further object is to provide an improved method of operating a stacking system and its conveyor.

SUMMARY OF THE INVENTION

An apparatus for stacking sheets on pallets has according to the invention a conveyor belt having horizontally extending upper and lower reaches extending through a stacking station with the upper reach defining a horizontal support plane and extending in an outfeed direction. Two sets of deflectors spaced apart in the outfeed direction engage the upper reach to form therein respective upwardly open U-shaped loops below the plane. A lift has a pair of support beams extending transverse to the direction and jointly displaceable between a lower position received in the respective loops and below the plane and an upper position above the plane. A succession of sheets is fed to the station to form on a pallet supported on the beams in the upper position thereof a stack of the sheets. The lift can be raised and lowered to displace it from the upper position to the lower position to deposit on the belt the pallet and stack of sheets on the beams. A drive advances the belt in the outfeed direction with the beams in the lower position to convey the stack of sheets hitherto supported on the beams away from the lift in the outfeed direction.

Such an apparatus is simple and is relatively immune to disturbances caused by objects falling into or on it, e.g. loose sheets. A belt conveyor is relatively safe for the servicing personnel and it can readily be adapted to transport paths of different lengths. It can easily be recessed in the floor and is also easily set up for stackers of different widths.

The belt according to the invention is formed by a pair of parallel, side-by-side belts spaced laterally apart. Each belt is made at least partially of plastic and has a toothed back coated with a friction-resistant material. The belts are between 50 mm and 150 mm wide and are laterally spaced by between 500 mm and 1000 mm. The belt backs are formed with teeth having planar outer ends.

According to further features of the invention respective upwardly open U-shaped guides receive the belts and slidably support the backs thereof. Similarly, respective downwardly open U-shaped guides receive the lower stretches of the belts. The drive includes upstream and downstream rollers over which the belt is spanned and a motor connected to one of the rollers. The support plane is generally flush with a floor level and there are at least two transport plates on the upper stretch displaceable thereby into and out of the station.

The method of this invention therefore comprises the steps of first supporting a pallet on the lift in the stacking station and providing on the belt in the parking station an empty pallet. The lift is held in the upper position while delivering to it and depositing on the pallet on it a succession of sheets to form on the pallet a stack. Once the stack reaches a predetermined size, the lift is lowered to the lower position to set the pallet carrying the stack on the belt while maintaining the belt stationary. Then the belt is advanced downstream in the infeed direction to simultaneously displace the empty pallet downstream into the stacking station and displace the pallet carrying the stack downstream into an unloading station. Thereafter the lift is raised to bring the new pallet into the upper position and the pallet carrying the stack is unloaded from the conveyor in the unloading station.

BRIEF DESCRIPTION OF THE DRAWING

The above and other objects, features, and advantages will become more readily apparent from the following description, reference being made to the accompanying drawing in which:

FIG. 2 is a top view of the floor conveyor of the inventive system; and

FIG. 3 is a large-scale sectional view through a detail of the invention.

SPECIFIC DESCRIPTION

Figure 1:
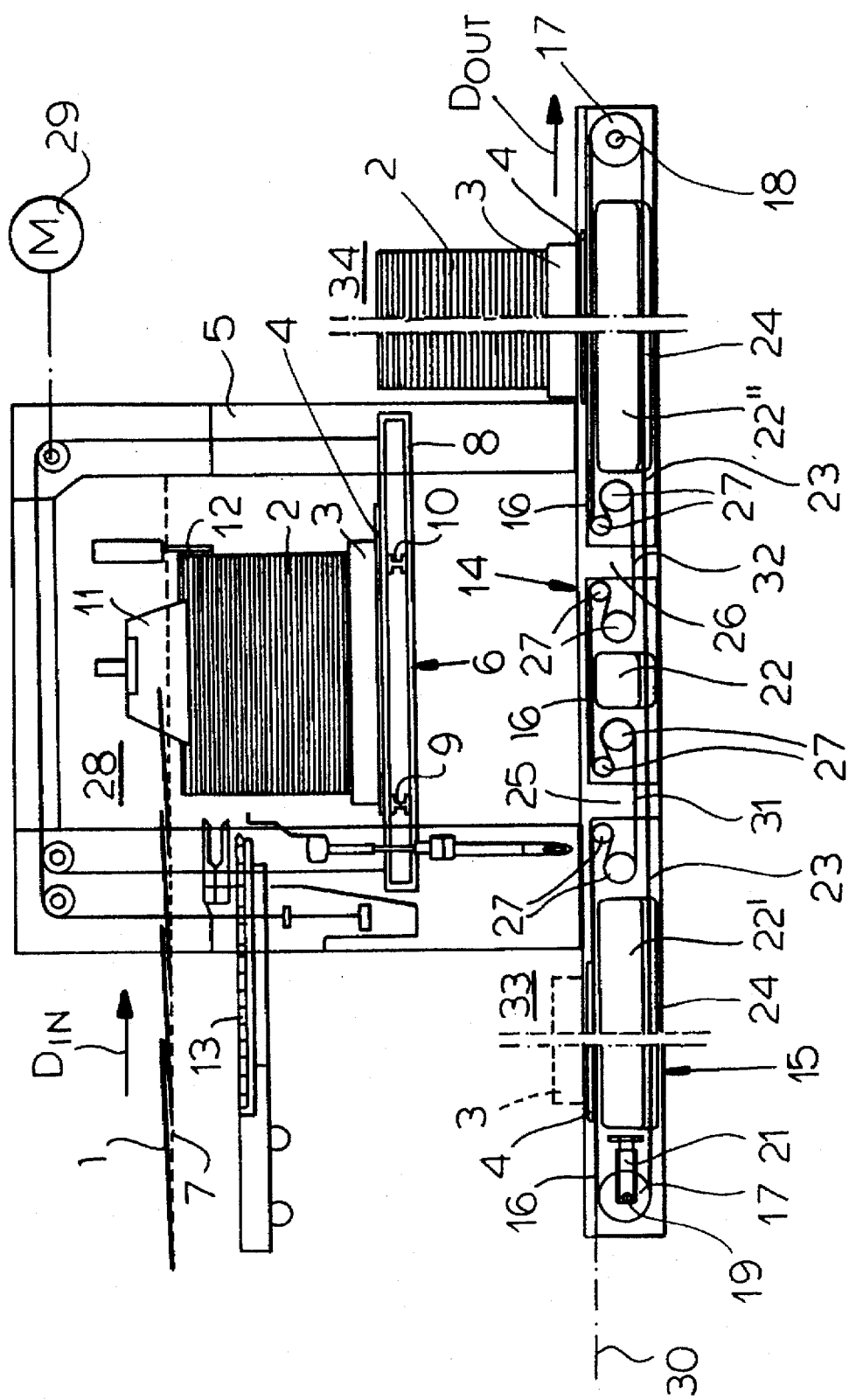
FIG. 1 is a partly schematic side view of the system of this invention.

As seen in FIG. 1 a succession of overlapping sheets 1, here stiff large-format sheets of paper, are delivered in an infeed direction $D_{in}$ to a stacking station 28 where they are deposited on a pallet 3 that sits on a transport plate 4, typically a stiff metal panel, to form a stack 2. The plate 4 is in turn supported on a lift structure 6 having a frame 8 provided with two I-beams 9 and 10 that extend transverse to and that are spaced apart in the infeed direction $D_{in}$. The beams 9 and 10 are both substantially longer than a maximum width W (see FIG. 2) for sheets defined by the width between uprights 5 of the machine frame. The lift 6 is vertically displaceable by a schematically illustrated drive 29 to an upper position shown in FIG. I somewhat below an infeed plane 7 and a lower position below a lower floor or outfeed plane 30. Lateral deflectors 11 and an end abutment 12 are provided to ensure that the sheets 1 stack up neatly on the pallet 3 in the station 28. A support 13 movable in the direction $D_{in}$ can be displaced into and out of the station 28 as described below.

As also shown in FIG. 2, extending through and underneath the station in an outfeed direction $D_{out}$ which may be parallel (as shown here) or perpendicular to the direction $D_{in}$, is a conveyor 14 comprising three endless and parallel belts 15 each having an upper stretch 16 and a lower stretch 23. The belts 15 are spanned over upstream and downstream rollers 17, the latter having a shaft 18 connected to a reversible drive motor 20 and the former having a shaft 19 connected to a spring-loaded belt tensioner 21.

The upper stretch is deflected downward into two upwardly open loops 31 and 32 by deflector rollers 27. These loops 31 and 32 are situated in transverse floor grooves 25 and 26 that are directly aligned underneath the beams 9 and 10 so that in an unillustrated lower position these beams 9 and 10 can sit wholly in the grooves 25 and 26, below the plane 30 and out of contact with the belts 15.

Between the grooves 25 and 26 the station 28 is provided with a support 22 shaped to fit underneath the toothed back of the upper stretch 16 so that it can slide easily on it. The lower stretch 23 rides in grooves 24 of this support block 22 and in further support blocks 22' and 22" upstream and downstream of the station 28. The belts 15 are laterally spaced by between 500 mm and 1000 mm and are each between 50 mm and 150 mm wide. They are made of a wear-resistant plastic, e.g. polyurethane, reinforced with steel cord and have as shown in FIG. 3 teeth 35 with flat outer faces. The guides 22, 22', and 22" are made of metal, preferably iron and the flat backs of the teeth 35 are coated with a polyamide fabric to slide with little friction on these guides. The overall length of the conveyor 14 is about three times longer than the length of the station 28, extending downstream to an unloading station 34 and upstream to a parking station 33.

The system described above operates as follows:

To start with as shown in FIG. 1 the beams 9 and 10 are in their upper position and the sheets i arrive and form a stack 2 thereon. Another plate 4 and pallet 3 are on the belts 15 in the parking station 33. Once the stack has reached the desired height, the motor 29 lowers the lift 6 down toward the stopped belts 15 until the plate 4 and its load constituted by the pallet 3 and stack 2 are sitting on the belts 15 on the center guide 22. As soon as the stack 2 drops below a certain intermediate level the support 13 moves downstream into position above it to intercept the continuously arriving sheets 1.

The drive 20 then advances the belts 15 downstream in the direction $D_{out}$ until the plate 4, pallet 3, and stack 2 are in the downstream station 34. This downstream movement of the belts 15 also displaces the other plate 4 and pallet 3 from the upstream parking station 33 into the loading station 28.

Subsequently at roughly the same time the drive 29 again lifts the beams 9 and 10 to bring the new empty pallet 3 up underneath the support 13 to assume its load and take on a new stack, while a fork lift or the like unloads the full pallet 3 from the downstream station 34. The support 13 withdraws upstream.

As the stack is forming in the upstream station the drive 20 reverses the belts 15 to bring the now empty plate 4 into the parking station 33 where it is supplied with another pallet 3 and the system can wait until the new stack is formed and the above-described cycle can be repeated.

We claim:

1. An apparatus for stacking sheets on pallets, the apparatus comprising:

a conveyor belt having horizontally extending upper and lower reaches extending through a stacking station, the upper reach defining a horizontal support plane and extending in an outfeed direction;

two sets of deflectors in the stacking station spaced apart in the outfeed direction and engaging the upper reach to form therein respective upwardly open U-shaped loops below the support plane;

a lift having a pair of support beams extending transverse to the outfeed direction and jointly displaceable between a lower position received in the respective loops and below the support plane and an upper position above the support plane;

means for feeding to the station a succession of sheets and for forming in the station on a pallet supported on the beams in the upper position thereof a stack of the sheets directly above the loops;

means for raising and lowering the lift for displacing it from the upper position to the lower position to deposit on the belt the pallet and the stack of sheets on the beams; and drive means for advancing the belt in the outfeed direction with the beams in the lower position to convey the stack of sheets hitherto supported on the beams away from the lift in the outfeed direction.

2. The sheet-stacking apparatus defined in claim 1 wherein the belt is made at least partially of plastic.

3. The sheet-stacking apparatus defined in claim 1 wherein the belt is formed by a pair of parallel, side-by-side belts spaced laterally apart.

4. The sheet-stacking apparatus defined in claim 3 wherein the belts have toothed backs coated with a friction-resistant material.

5. The sheet-stacking apparatus defined in claim 3 wherein the belts are between 50 mm and 150 mm wide and are laterally spaced by between 500 mm and 1000 mm.

6. The sheet-stacking apparatus defined in claim 3 wherein the belts have backs formed with teeth having planar outer ends.

7. The sheet-stacking apparatus defined in claim 6, further comprising respective upwardly open U-shaped guides receiving the belts and slidably supporting the backs thereof.

8. The sheet-stacking apparatus defined in claim 6 further comprising respective downwardly open U-shaped guides receiving lower stretches of the belts.

9. The sheet-stacking apparatus defined in claim 1 wherein the drive means includes upstream and downstream rollers over which the belt is spanned and a motor connected to one of the rollers.

10. The sheet-stacking apparatus defined in claim 1 wherein the support plane is generally flush with a floor level.

11. The sheet-stacking apparatus defined in claim 1, further comprising at least two transport plates on the upper stretch displaceable thereby into and out of the station.

12. An apparatus for stacking sheets on pallets, the apparatus comprising:

a plurality of parallel conveyor belts each having horizontally extending upper and lower reaches, the upper reaches defining a horizontal support plane and extending in an outfeed direction through a stacking station;

two sets of deflectors in the stacking station spaced apart in the outfeed direction and engaging the upper reaches to form therein respective upwardly open U-shaped loops below the support plane;

a lift having a pair of support beams extending transverse to the outfeed direction and jointly displaceable between a lower position received in the respective loops and below the support plane and an upper position above the support plane;

means for feeding to the stacking station a succession of sheets and for forming on a pallet supported on the beams in the upper position thereof a stack of the sheets directly above the loops;

means for raising and lowering the lift for displacing it from the upper position to the lower position to deposit on the belts the pallet and the stack of sheets on the beams; and drive means for advancing the belt in the outfeed direction with the beams in the lower position to convey the stack of sheets hitherto supported on the beams away from the lift in the outfeed direction.

13. A method of operating an apparatus for stacking sheets on pallets, the apparatus having:

a conveyor belt having horizontally extending upper and lower reaches, the upper reach defining a horizontal support plane and extending in an outfeed direction from an upstream parking station through a central stacking station into a downstream unloading station;

two sets of deflectors spaced apart in the outfeed direction and engaging the upper reach to form therein respective upwardly open U-shaped loops below the support plane; and a lift in the stacking station and having a pair of support beams extending transverse to the outfeed direction and jointly displaceable between a lower position received in the respective loops and below the support plane and an upper position above the support plane;

the method comprising the steps of:

supporting a pallet on the lift in the stacking station and providing on the belt in the parking station an empty pallet;

holding the lift in the upper position while delivering to it and depositing on the pallet a succession of sheets to form on the pallet a stack;

once the stack reaches a predetermined size, lowering the lift to the lower position to set the pallet carrying the stack on the belt while maintaining the belt stationary;

advancing the belt downstream in the infeed direction to simultaneously
  displace the empty pallet downstream into the stacking station and
  displace the pallet carrying the stack downstream into an unloading station;

thereafter raising the lift to bring the new pallet into the upper position and unloading the pallet carrying the stack from the conveyor in the unloading station.

* * * * *